US010549385B2

(12) United States Patent
Krüger et al.

(10) Patent No.: US 10,549,385 B2
(45) Date of Patent: Feb. 4, 2020

(54) METHOD FOR LASER MELTING WITH AT LEAST ONE WORKING LASER BEAM

(71) Applicant: SIEMENS AKTIENGESELLSCHAFT, München (DE)

(72) Inventors: Ursus Krüger, Berlin (DE); Olaf Rehme, Hamburg (DE); Daniel Reznik, Berlin (DE); Martin Schäfer, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 695 days.

(21) Appl. No.: 14/778,524

(22) PCT Filed: Mar. 6, 2014

(86) PCT No.: PCT/EP2014/054308
§ 371 (c)(1),
(2) Date: Sep. 18, 2015

(87) PCT Pub. No.: WO2014/146903
PCT Pub. Date: Sep. 25, 2014

(65) Prior Publication Data
US 2016/0250717 A1    Sep. 1, 2016

(30) Foreign Application Priority Data

Mar. 21, 2013  (DE) .................. 10 2013 205 029

(51) Int. Cl.
*B23K 26/342* (2014.01)
*B23K 26/00* (2014.01)
*B33Y 10/00* (2015.01)

(52) U.S. Cl.
CPC ........ *B23K 26/342* (2015.10); *B23K 26/0006* (2013.01); *B33Y 10/00* (2014.12)

(58) Field of Classification Search
CPC . B22F 3/1055; B23K 26/0006; B23K 26/342; B29C 64/153; B29C 64/20; B33Y 10/00; Y02P 10/295
See application file for complete search history.

(56) References Cited

U.S. PATENT DOCUMENTS

| 2009/0176007 A1 | 7/2009 | Uckelmann | |
| 2009/0283501 A1* | 11/2009 | Erikson | B22F 3/1055 219/76.1 |
| 2011/0123383 A1* | 5/2011 | Fuwa | B22F 3/1055 419/11 |
| 2012/0237745 A1 | 9/2012 | Dierkes et al. | 428/215 |
| 2013/0064706 A1 | 3/2013 | Schwarze et al. | |
| 2013/0112672 A1* | 5/2013 | Keremes | B22F 3/1055 219/121.78 |
| 2013/0233846 A1* | 9/2013 | Jakimov | B22F 3/1055 219/601 |
| 2015/0306666 A1* | 10/2015 | Honda | B22F 3/1055 425/78 |
| 2015/0306820 A1 | 10/2015 | Colin et al. | 264/482 |
| 2015/0321255 A1* | 11/2015 | Colin | B22F 3/1055 419/55 |

FOREIGN PATENT DOCUMENTS

| CN | 101580929 A | 11/2009 | ............. C23C 14/28 |
| CN | 101607311 A | 12/2009 | ............. B22F 3/105 |
| DE | 102005050665 A1 | 4/2007 | |
| DE | 102010050531 A1 | 3/2012 | |
| DE | 102010048335 A1 | 4/2012 | |
| DE | 102013205029.1 | 3/2013 | |
| EP | 2 119 530 A1 | 11/2009 | |
| EP | 2737964 A1 | 6/2014 | ............... B22F 3/10 |
| WO | 2011/066989 A1 | 6/2011 | |
| WO | PCT/EP2014/054308 | 3/2014 | |
| WO | 2014/144482 A1 | 9/2014 | ............. B23K 23/00 |

OTHER PUBLICATIONS

International Search Report for PCT/EP2014/054308 dated Aug. 6, 2014.
German OA for Appln. No. 102013205029.1 dated Nov. 8, 2013.
European Office Action, Application No. 14709233.2, 5 pages, dated Oct. 10, 2018.

* cited by examiner

*Primary Examiner* — Ibrahime A Abraham
*Assistant Examiner* — Biniam B Asmelash
(74) *Attorney, Agent, or Firm* — Slayden Grubert Beard PLLC

(57) ABSTRACT

A component is produced in layers by laser melting. A molten pool is created in a bed of powder by a working laser beam. Further auxiliary laser beams are set to a power density that merely slows down the cooling of the material in one zone, but do not cause any renewed melting. In this way, the cooling rate of the microstructure can be set so that an advantageous structural formation develops. This allows for example the mechanical properties of the component produced to be advantageously improved without downstream heat treatments.

21 Claims, 1 Drawing Sheet

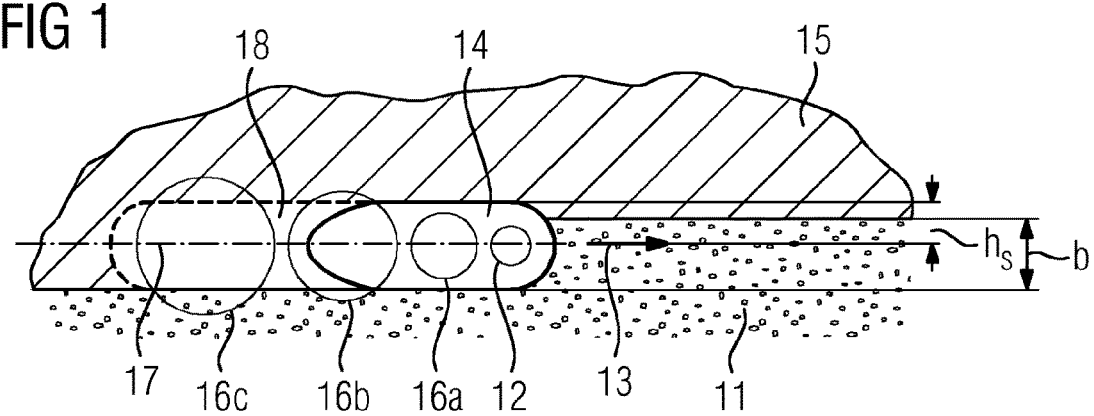
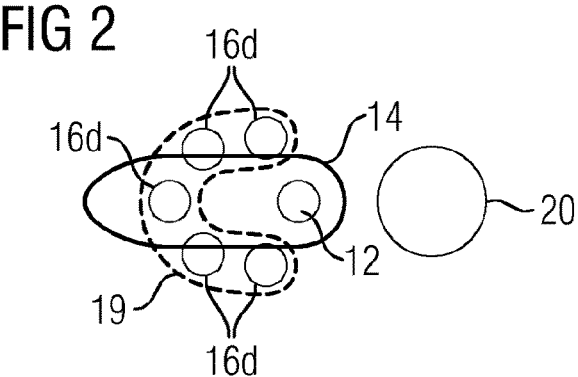
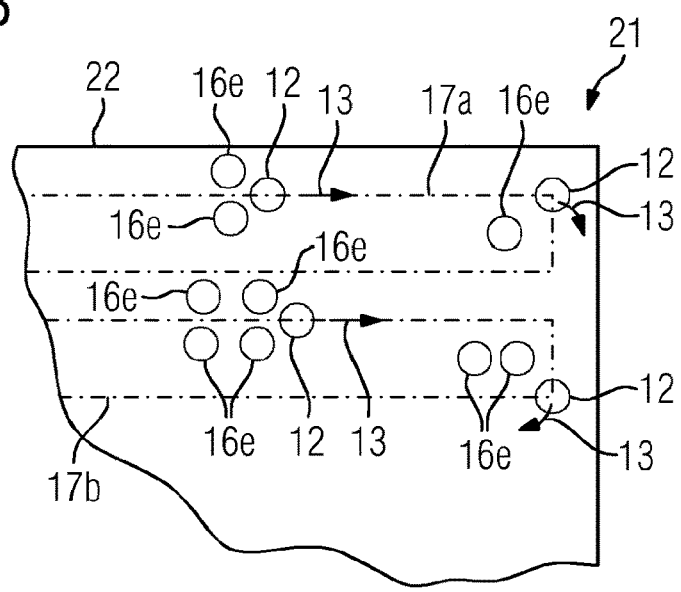

METHOD FOR LASER MELTING WITH AT LEAST ONE WORKING LASER BEAM

CROSS REFERENCE TO RELATED APPLICATIONS

This application is the U.S. national stage of International Application No. PCT/EP2014/054308, filed Mar. 6, 2014 and claims the benefit thereof. The International Application claims the benefit of German Application No. 102013205029.1 filed on Mar. 21, 2013, both applications are incorporated by reference herein in their entirety.

BACKGROUND

Described below is a method for laser melting, in which a component is produced in layers in a bed of powder, in that the particles forming the bed of powder are melted by at least one working laser beam. When they solidify, the particles then form a layer of the component. Subsequently, successive further layers of powder particles are formed on the solidified area of the component and are in turn melted by the working laser beam. This produces a three-dimensional component layer by layer.

Methods of the type specified at the beginning are known. One problem concerning the implementation of such methods is the high rate of cooling that occurs when cooling the molten pool produced in the powder by the laser beam. This typically leads to the formation of a very fine-grained microstructure, which, depending on the application, does not bring about the desired mechanical component properties. In particular, the elongation at break and the creep resistance may be reduced. In order subsequently to achieve a desired range of properties of the component produced, a heat treatment may be carried out, with the result of making the grains coarser. However, such a heat treatment cannot be carried out in the case of all materials. Furthermore, this heat treatment means that there is additional expenditure in terms of energy and production, whereby the cost-effectiveness of the components produced suffers.

In addition to the working laser beam, which produces the energy input for melting the molten pool, it is possible according to DE 10 2010 050 531 A1 and DE 10 2010 048 335 A1 to use at least one auxiliary laser beam of which the power density is too low to bring about melting of the particles. This at least one auxiliary laser beam is directed onto a cooling zone following the molten pool and lying on the component. The energy input brought about by the auxiliary laser beam is therefore not sufficient to melt the particles. This also means, however, that the auxiliary laser beam cannot keep the particles in the molten state. Rather, a cooling of the molten pool, and also of the cooling zone lying on the component, can be noted, but the auxiliary laser beam reduces the cooling rate, and consequently the temperature gradient in the cooling component.

The method improves laser melting to the extent that more favorable component properties with regard to the mechanical characteristic values can be produced.

SUMMARY

Accordingly, the power density of the auxiliary laser beam or the auxiliary laser beams is controlled in dependence on the volume of the component already produced that is surrounding the cooling zone, in that the power density is reduced all the more the less volume is available for heat removal. It is advantageously taken into account thereby that the conditions that prevail in the middle of the area to be produced in the bed of powder do not necessarily correspond to those in the vicinity of edges of this area to be produced. For example, there is comparatively less additional material available for heat conduction at the first edge to be produced or else in corners of an area to be produced or else in narrow webs to be produced than in the middle of an area to be produced. Therefore, the power output of the auxiliary laser beams can be reduced in these areas in order to provide compensation for the delayed heat removal. This advantageously allows even more homogeneous microstructural properties to be produced in the component as a whole. At the same time, the formation of component stresses can be at least partially avoided.

The power density (hereinafter, power density always means the surface power density, which is also referred to as the intensity of the laser) of the laser beam is defined by the power output of the laser beam and the point of impingement of the same on the bed of powder, the molten pool or the completed component. This may be specified for example in $W/cm^2$. Taking these definitions into account, the power density of the auxiliary laser beam may be less than the heat removal during the cooling of the molten pool up until solidification, which can likewise be specified as thermal output per unit area in $W/cm^2$.

The resultant microstructure that is obtained by the method with slower cooling of the molten pool and of the component advantageously satisfies a wide range of requirements. It is possible in particular to produce coarser grained microstructures, which have a better creep resistance and increased elongation at break in comparison with the rapidly cooled, fine-grained microstructures. The slower cooling rate also allows a positive influence to be exerted on the setting of certain microstructural states that are obtained when the cooling rate falls below a certain level. The desired phase states of the alloy or microstructural properties such as grain size can in this way form in a specifically intended manner, a "microstructure design" as it were being made possible by the method. This makes it possible to dispense with subsequent treatments that are intended to create such microstructural properties. The microstructural properties are as it were already created in situ during production.

According to an advantageous refinement of the method, it is provided that the auxiliary laser beam is guided with a time delay on the basis of a pattern of movement coinciding with the working laser beam. This means in other words that the auxiliary laser beam follows the molten pool in such a way that, with production conditions remaining the same, its energy input influences the result that is produced by the working laser beam. This advantageously allows particularly homogeneous microstructural results to be achieved. Furthermore, it is advantageously very easy to control this method, since the programming for guiding the auxiliary laser beam can be taken over from that of the main laser beam.

According to another refinement of the method, it is provided that a number of auxiliary laser beams are used, guided in a pattern of movement coinciding with the working laser beam. In this case, the points of impingement of the auxiliary laser beams produce a crescent-shaped or horseshoe-shaped heat influencing area, which has the result that the zones of thermal influence of the auxiliary laser beams respectively overlap. In technical terms, this means that just one common heat influencing area can be measured. This area may also be open in the direction of movement of the working laser beam. In other words, the cooling of the molten pool is slowed down by the auxiliary laser beams at one and the same time in all directions apart from the one lying ahead of the working laser beam. The heat removal is consequently reduced in all directions extending from the molten pool, since the working laser beam itself likewise prevents cooling in the direction in which the heat influencing area is open.

It may also be advantageous that the at least one auxiliary laser beam is produced from one laser beam by way of a beam splitter. This not only covers the case where the one laser beam is used both for forming the working laser beam and for forming at least one auxiliary laser beam. Another possibility is that of not reducing the intensity of the working laser beam that has the highest power density by creating divisions of the beam and using another, shared laser beam divided up by the beam splitter for a number of auxiliary laser beams. In both cases, the expenditure on components is advantageously reduced, since the use of a beam splitter can avoid the use of a number of lasers.

According to another refinement of the method, it is provided that the auxiliary laser beam or the auxiliary laser beams undergo(es) a beam widening. This allows the radiation intensity of the auxiliary laser beams to be adapted in a suitable way. This adaptation may be performed adaptively, advantageously allowing the laser power output to be optimally utilized when lower power densities are required, in that the laser beam undergoes greater beam widening. Therefore, with given plant technology, the efficiency of the method can be optimally increased by this measure.

According to another refinement of the method, it is provided that the auxiliary laser beam or at least some of the auxiliary laser beams can be directed onto the edge of the molten pool. In this zone, the solidification of the molten metal can be advantageously slowed down most effectively. This is where processes that are essential for the formation of the microstructure and can be positively influenced by the auxiliary laser beams or the auxiliary laser beam take place. The mechanisms already mentioned above are used thereby.

It is also advantageous if the auxiliary laser beam or at least some of the auxiliary laser beams can be directed onto the part of the solidified layer that is in the cooling zone. The further cooling processes of the already solidified metal microstructure are advantageously positively influenced thereby. Here it is a matter of achieving the formation of the desired microstructural states by a sufficiently slow cooling rate, which makes subsequent heat treatment superfluous. It goes without saying that the action of auxiliary laser beams on the cooling zone may also be combined with the action of auxiliary laser beams on the edge of the molten pool already mentioned above, if this leads to the optimum microstructural results. The respective application must be taken into account here, the cooling conditions for certain microstructural states normally being known from general metallurgy. By contrast, controlling the temperature when carrying out laser melting methods according to the related art, such as for example by preheating the bed of powder, has only been able to contribute to a limited extent to achieving the optimum cooling conditions, since the local cooling conditions have been predetermined by the particular method concerned. Only the additional use of auxiliary laser beams makes local setting of the cooling conditions possible simultaneously with optimized microstructure formation.

Since the bed of powder is a poor heat conductor, the action of the auxiliary laser beams on the cooling zone and the molten pool is particularly effective. However, an additional laser beam may also be used to preheat the particles already before the melting by the working laser beam. Also in the case of this additional beam, the power density is too low to bring about melting of the particles, otherwise it would already pre-empt the function of the working laser beam. The preheating of the particles has the advantage that the working laser beam has to provide a smaller amount of heat to produce the molten pool. This is of advantage in particular in the case of high-melting materials.

For the auxiliary laser beams, but also for the additional laser beam, the power density may be advantageously chosen in each case at over 50%, such as over 70%, of the power density required for melting the particles. This advantageously achieves a sufficient safety margin to ensure that the particles are not melted. On the other hand, the power density of the auxiliary laser beam, the auxiliary laser beams or the additional laser beam is high enough to ensure sufficient preheating of the particles or a sufficiently low cooling rate of the component microstructure that has just been produced. Another possibility is advantageously to provide the power density of the at least one auxiliary laser beam or the additional laser beam in each case at over 30%, such as over 50%, of the power density of the working laser beam. In this way, the ratio is consequently determined by the power output of the working laser beam of which the power density is chosen in dependence on the material to be melted. The power density of the working laser beam may for example be set such that it lies at 150%, or at over 150%, of that power density that would just about lead to melting of the particles.

A further refinement of the method is obtained if a number of auxiliary laser beams that are guided at different distances from the working beam are used. They are therefore cascaded with a certain time delay after the working laser beam. It is particularly advantageous in this case if the auxiliary laser beams at increasing distances from the working laser beam are respectively operated with a lower power density, so that a linear or at least successive cooling of the microstructure just produced becomes possible. The power densities of the successive auxiliary lasers may also be advantageously set such that a non-linear cooling profile can be produced, if for example a certain changing of the microstructure is achieved at a certain temperature. This could for example be a temperature at which certain phase states form.

According to another refinement of the method, it is provided that the particles are formed from a highly heat-resistant metal alloy, in particular a highly heat-resistant steel or a highly heat-resistant nickel-based alloy. One particular example of this is that of nickel-based alloys that must pass through a temperature profile suitable for gamma-prime hardening during cooling. In the case of these alloys mentioned, the method can be used particularly advantageously, because these alloys are dependent on certain temperature profiles during cooling in terms of the formation of their microstructure to produce high heat resistance, in order for the required microstructural properties to be achieved at all. This temperature profile can be set by the measures specified above. Highly heat-resistant metal alloys are to be understood as meaning those metal alloys that allow operating temperatures above 650° C.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a cross section and

FIG. 2 is a plan view of the molten pool and the areas of impingement of a working laser beam, an additional laser beam and three or five auxiliary laser beams according to two exemplary embodiments of the method; and FIG. 3 is a plan view of an exemplary embodiment of the method described below in which different auxiliary laser beams in different sectors of the area to be produced are switched on and off.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In FIG. 1 it can be seen that a component not represented any more specifically is produced in a bed of powder 11. For this purpose, a working laser beam 12 that melts the particles is guided over the bed of powder in the direction of the arrow 13. As it does so, the molten pool 14 indicated is produced. After solidification of the material outside the molten pool, a layer 15 of the component is produced.

In order that the layer 15 can be formed as an uninterrupted layer, it must be ensured that the distance hs between adjacent laser traces (also known as the hatch distance) turns out to be smaller than the width b of the molten pool 14. This produces an overlap of the molten pool 14 with parts of the layer 15 already produced, whereby an uninterrupted surface of the component to be produced is obtained.

Apart from the working laser beam 12, three auxiliary laser beams 16a, 16b, 16c are also used, following the working laser beam 12 with a time delay and a spatial offset on the active laser trace 17. The auxiliary laser beam 16a is directed onto the molten pool and consequently slows down its solidification. The auxiliary laser beam 16b is directed onto the interface between the molten pool 14 and the solidified material. The auxiliary laser beam 16b consequently slows down the solidifying process as such. The auxiliary laser beam 16c is primarily directed onto a cooling zone 18 on the material that has just solidified. This means a zone in which the material has already solidified, but the microstructure is still undergoing a cooling process that is still relevant for the formation of the microstructure. In this cooling zone, the auxiliary laser 16c can slow down the cooling and enable processes in the cooling microstructure that could otherwise only be achieved by a heat treatment.

In FIG. 2, a working laser beam 12 and the molten pool 14 produced by it can likewise be seen. Further details such as those represented in FIG. 1 have been omitted in FIG. 2. They are however analogous to FIG. 1. One difference, however, is that a number of identical auxiliary laser beams 16d are used, produced by a beam splitter that is not represented any more specifically. These auxiliary beams surround the molten pool 12 in the form of a horseshoe, so that they together produce a heat influencing area 19. This is also formed in the shape of a horseshoe. In this way, heat dissipation of the molten pool can be effectively prevented on all sides, and at the same time a subsequent heating of the molten pool itself can be achieved. In addition to the auxiliary laser beams 16d, an additional laser beam 20 that is produced by preheating the bed of powder is also used. This additional beam is provided with beam widening that is not represented any more specifically, so that the area of impingement is enlarged. As a result, the power density is reduced to such an extent that melting of the particles of the powder is avoided.

In FIG. 3 it can be seen how a component 21 is produced. The bed of powder is not represented any more specifically for the sake of overall clarity. As long as the working laser beam 12 is tracking the first laser trace 17a, located at the edge 22, for the layer to be produced at the given time, the heat removal is still very limited, for which reason only two auxiliary laser beams 16e are used. In fact, four auxiliary laser beams 16 are arranged regularly in a square area of impingement, as represented when a beam is passing over a laser trace 17b in the middle of the component area. By contrast, only a single auxiliary laser beam 16e is used at the corners of the component, since here the heat removal is prevented in two directions. Proceeding further, where the laser trace 17b does not end at a corner of the component but at its edge, where the heat removal is only prevented in one direction, two auxiliary laser beams 16e are used. Altogether, this allows the effect to be achieved that the cooling rate of the material at the edge of the component 21 is essentially just as high as in the interior of the component produced.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for laser melting to form a component in layers in a bed of powder, the method comprising:
   melting particles forming the bed of powder using a working laser beam;
   directing a respective centerpoint each of a plurality of auxiliary laser beams, each auxiliary laser beam having a power density too low to melt the particles, onto at least one of a cooling molten pool formed by the melted particles and a cooling zone on the component, adjacent the molten pool after a centerpoint of the working laser beam has moved away to a new working position;
   guiding the plurality of auxiliary laser beams in a pattern of movement to form a heat influencing area having one of a crescent shape and a horseshoe shape, open in a direction of movement of the working laser beam;
   wherein the respective centerpoints of the plurality of auxiliary laser beams are spaced apart from each other and from the centerpoint of the working laser beam at any point in time;
   controlling the power density of the at least one auxiliary laser beam in dependence upon a volume of the component, already produced, surrounding the cooling zone; and
   cooling the molten pool until solidified to form a solidified layer of the component, while at least one of reducing the power density and gradually switching off auxiliary laser beams as less of the volume of the component is available for heat removal.

2. The method as claimed in claim 1, further comprising guiding the centerpoint of at least one of the plurality of auxiliary laser beams with a time delay based on a pattern of movement coinciding with the working laser beam so that the centerpoint of the at least one auxiliary laser beam reaches an area the working laser beam has previously melted after the centerpoint of the working laser beam has moved away to the new working position.

3. The method as claimed in claim 1, wherein the at least one auxiliary laser beam is a plurality of auxiliary laser beams produced from one laser beam by a beam splitter.

4. The method as claimed in claim 1, further comprising beam widening of at least one of the plurality of auxiliary laser beams.

5. The method as claimed in claim 1, wherein said directing directs at least one of the plurality of auxiliary laser beams onto an edge of the molten pool.

6. The method as claimed in claim 1, wherein said directing directs at least one of the plurality of auxiliary laser beams onto a part of the solidified layer in the cooling zone.

7. The method as claimed in claim 1, wherein the power density of at least one of the plurality of auxiliary laser beams is over 50% of a melting power density required for melting the particles.

8. The method as claimed in claim 1, wherein the power density of at least one of the plurality of auxiliary laser beams is over 70% of a melting power density required for melting the particles.

9. The method as claimed in claim 1, wherein the power density of at least one of the plurality of auxiliary laser beams is over 30% of a working power density of the working laser beam.

10. The method as claimed in claim 1, wherein the power density of at least one of the plurality of auxiliary laser beams is over 50% of a working power density of the working laser beam.

11. The method as claimed in claim 1, wherein the respective centerpoints of the plurality of auxiliary laser beams are spaced at different distances from the centerpoint of the working laser beam.

12. The method as claimed in claim 11, wherein the plurality of auxiliary laser beams at increasing distances from the working laser beam are operated with respectively lower power densities.

13. The method as claimed in claim 1, further comprising preheating the particles, before said melting by the working laser beam, using at least one of the plurality of auxiliary laser beams having a low power density too low to melt the particles.

14. The method as claimed in claim 1, wherein the particles are formed of a heat-resistant metal alloy.

15. The method as claimed in claim 1, wherein the particles are formed of a heat-resistant steel.

16. The method as claimed in claim 1, wherein the particles are formed of a heat-resistant nickel-based alloy.

17. A method for laser melting to form a component in layers in a bed of powder, the method comprising:
melting particles forming the bed of powder by a working laser beam;
directing a centerpoint of a first auxiliary laser beam, having a power density too low to melt the particles, onto at least one of a cooling molten pool formed by the melted particles and a cooling zone on the component, adjacent the molten pool after a centerpoint of the working laser beam has moved away to a new working position;
wherein the centerpoint of the working laser advances along a working laser path in a movement direction, and the centerpoint of the first auxiliary laser beam simultaneously advances along a first auxiliary laser path that is parallel to the working laser path but offset from the working laser path in a direction perpendicular to the movement direction; and
cooling the molten pool until solidified to form a solidified layer of the component, while at least one of reducing the power density and gradually switching off the first auxiliary laser beam as less of the volume of the component is available for heat removal.

18. The method as claimed in claim 17, comprising directing a plurality of auxiliary laser beams including the first auxiliary laser beam, each having a power density too low to melt the particles, onto at least one of the cooling molten pool formed by the melted particles and the cooling zone on the component.

19. The method as claimed in claim 18, wherein the plurality of auxiliary laser beams includes a second auxiliary laser beam having a centerpoint that advances along the working laser path in the movement direction.

20. A method for laser melting to form a component in layers in a bed of powder, the method comprising:
melting particles forming the bed of powder by a working laser beam;
directing a centerpoint of a first auxiliary laser beam, having a power density too low to melt the particles, onto at least one of a cooling molten pool formed by the melted particles and a cooling zone on the component, adjacent the molten pool after a centerpoint of the working laser beam has moved away to a new working position;
wherein the centerpoint of the first auxiliary laser beams is spaced apart from the centerpoint of the working laser beam;
wherein the first auxiliary laser beam is widened, as compared with the working laser beam, such that a surface area impinged by the first auxiliary laser beam is larger than a corresponding surface area impinged by the working laser beam; and
cooling the molten pool until solidified to form a solidified layer of the component, while at least one of reducing the power density and gradually switching off the first auxiliary laser beam as less of the volume of the component is available for heat removal.

21. The method as claimed in claim 17, comprising directing a plurality of auxiliary laser beams including the first auxiliary laser beam and a second auxiliary laser beam, each having a power density too low to melt the particles, onto at least one of the cooling molten pool formed by the melted particles and the cooling zone on the component;
wherein the second auxiliary laser beam is widened to a different extent than the first auxiliary laser beam, such that surface area impinged by the second auxiliary laser beam is different than both (a) the surface area impinged by the first auxiliary laser beam and (b) the surface area impinged by the working laser beam.

* * * * *